United States Patent Office 2,864,718
Patented Dec. 16, 1958

2,864,718
WORKABILITY OF CLAY SOILS

John W. Lyons, Reading, Mass., assignor to Monsanto Chemical Company, St. Louis, Mo., a corporation of Delaware No Drawing. Application April 15, 1957
Serial No. 652,650

19 Claims. (Cl. 106—287)

This invention relates to an improved procedure for increasing the workability of clay soils and to the improved clay soil obtained thereby. More specifically this invention relates to an improved process for increasing the workability of clay soils wherein the said soils are treated with a minor amount of a condensation product of a tertiary-alkylmercaptan with a plurality of moles of ethylene oxide.

A major problem in the construction industry relating to soil engineering has been providing a suitable means of incorporating modifying chemicals into clay-containing soils. For example, soil-cement compositions have been widely employed in the construction of highway subgrade, but have not been generally successful with highly plastic soils. It generally has been found that the higher the plastic index of the clay-containing soils, the more difficult it is to intimately mix the cement with the clay soil. This is also generally true with various other materials which may be added to soils to modify the physical characteristics thereof.

The principal object of this invention is to provide a means of substantially improving the workability of clay-containing soils. Another object of this invention is to provide a means of decreasing the plastic index of clay-containing soils. Still another object of this invention is to provide a means of effecting the mixing of materials into wet clay-containing soils at a net power reduction in the mixing operation and effecting a more homogeneous mixture in a shorter time. Other objects will be apparent from the following disclosure.

It has now been found that the addition of from about 0.05 to about 2 percent and preferably from about 0.1 to about 1 percent by weight, based on the dry weight of the soil, of a condensation product of a tertiary-alkylmercaptan with a plurality of moles of ethylene oxide, as hereinafter more fully defined, to clay-containing soils effects a reduction in the plastic index of the clay-containing soil, thereby rendering the clay-containing soil workable over a wider range of moisture content, and provides a clay soil wherein chemical modifiers can be readily mixed into the soil to effect a substantially uniform distribution therein and the mixing operation is effected at a lower net power consumption.

The condensation products of tertiary-alkylmercaptans with a plurality of moles of ethylene oxide which can be employed in this invention can be defined by the structural formula $RS(CH_2CH_2O)_nH$, wherein R is a tertiary-alkyl radical containing from 8 to 16 carbon atoms and $n$ is an integer from 2 to 20. Whereas $n$ is an integer in the aforesaid class of condensation products, it should be understood that the said condensation products comprise a blend of products having a varying mole ratio of ethylene oxide to the tertiary-alkylmercaptan, such that the average value of $n$ for a given composition will generally be a mixed number. Tertiary-dodecylmercaptan condensed with from 4 to 14 moles of ethylene oxide, and preferably from 6 to 10 moles of ethylene oxide, comprises the preferred class of condensation products of this invention. Various other suitable tertiary-alkylmercaptan-ethylene oxide condensates are for example tertiary-octylmercaptan condensed with about 6 moles of ethylene oxide, tertiary-tetradecylmercaptan condensed with about 10 moles of ethylene oxide, tertiary-hexadecylmercaptan condensed with about 14 moles of ethylene oxide, and the like. The preparation of the subject class of condensates is disclosed in U. S. Patent No. 2,565,986 and U. S. Patent No. 2,570,050 and it should be understood that the various other tertiary-alkylmercaptan-ethylene oxide condensates disclosed therein, which are within the above-defined limits, are suitable in the instant invention.

The clay-containing soils which can be benefited by the addition of minor amounts of a tertiary-alkylmercaptan-ethylene oxide condensation product preferably include those soil compositions containing from about 20 to about 70 percent or more of clay in accordance with the well-known triaxial textural classification chart of the U. S. Bureau of Chemistry and Soils. These soils include the various soils classified as clay, sandy clay, silty clay, clay loam, sandy clay loam, and silty clay loam. Various illustrative specific clay-containing soils are for example clay from the Hybla Valley, Virginia, Cecil clay, Houston clay, Lake Charles clay, Capay silty clay loam, and the like.

The workability of the clay-containing soil can be modified by the treatment with the tertiary-alkylmercaptan-ethylene oxide condensation product prior to the addition of other chemical modifiers such as Portland cement, and this procedure may be preferred with particularly gummy clay soils, or can be added in a single-treatment operation with other materials. In the latter cases the treatment of the clay-containing soil can be readily effected by the addition of a calculated amount of the aforesaid condensation product, or an aqueous solution thereof, and the other chemical modifiers in finely divided solid or liquid form, depending on the depth of soil to be treated and the moisture content of said soil, by application with a P and H Single-Pass Soil Stabilizer, Seaman Pulvi-mixer, or similar apparatus, or by application of the said materials and any necessary additional amount of water, to provide the optimum moisture conditions for compaction of the particular soil being treated, to the soil surface by other suitable means and mixing with various traveling pug mills, roto-tillers and the like. Normally it is desirable to treat the soil to a compacted depth of at least about 6 inches to provide a well-stabilized subgrade. After the treatment of the clay-containing soil with the desired amount of the tertiary-alkylmercaptan-ethylene oxide condensation product and stabilizer materials it is compacted by the application of a sheepsfoot roller and thereafter leveled and further compacted by pneumatic-tired rollers and then with smooth rollers if desired. Thereafter the treated soil is generally covered with a light coating of bituminous material by spray application or other suitable means to prevent substantial loss of moisture therefrom during curing. Then a suitable subbase and topping can be applied thereover or the topping can be applied directly to the stabilized subgrade as desired.

The plastic index of a soil is defined as the range of moisture content over which the soil is plastic and is expressed as the difference between the moisture content of the soil at the liquid limit minus the moisture content of the soil at the plastic limit. It will be seen from the following examples that the tertiary-alkylmercaptan-ethylene oxide condensation products effect a reduction in the plastic index and generally increase the plastic limit of the soil whereby it is apparent that the treated soil can be worked over a correspondingly greater moisture content.

The following examples are illustrative of the instant invention.

Example 1

A sample of clay from the Hybla Valley in Virginia containing 33 percent clay, 24 percent silt, and 43 percent sand was employed to demonstrate the effect of the presence of the nonionic tertiary-dodecylmercaptan (TDM)-ethylene oxide (EO) condensate on the Atterberg limits of the said soil. In each instance 2 weight percent, based on the dry weight of the soil, of the indicated tertiary-dodecylmercaptan-ethylene oxide adduct was employed. The evaluation of these compositions is given in the following table:

| Percent TDM-EO | Moles EO / Mole TDM | Liquid Limit | Plastic Limit | Plastic Index | Percent PI Change |
|---|---|---|---|---|---|
| 0 | | 46 | 22 | 24 | |
| 2 | 6.3 | 44 | 28 | 16 | −33.3 |
| 2 | 7.8 | 44 | 30 | 14 | −41.7 |
| 2 | 10.5 | 44 | 29 | 15 | −37.5 |

It was also noted that the presence of 2 percent of the above-disclosed condensation products effected a visible and marked reduction in the binding and jamming of a mixer employed to work this soil.

Example 2

A relative quantitative test was devised to determine variations in soil workability by measuring the differences in power drawn by a mixer during a fixed period of time, which test was supplemented by visual observation during the mixing procedure. The mixer was allowed to run for a sufficient period to warm up the motor and bearings then the power consumption of the mixer for an 18-minute period was determined. Then sufficient air-dry test soil was added to the mixer to provide 1500 parts by weight of oven-dry (110° C.) soil and the desired quantity of water and/or tertiary-dodecylmercaptan-ethylene oxide condensate was quickly added thereto. The mixer was started simultaneously with the addition of the liquid and the power consumption determined for an 18-minute run.

A heavy clay soil identified as Panton clay from Burlington, Vermont, and containing 70 percent clay, 22 percent silt, and 8 percent sand was evaluated in the aforesaid manner at various moisture contents. The percent power reduction was determined with the incorporation therein of about 0.1 percent of the condensation product of tertiary-dodecylmercaptan and 7.8 moles of ethylene oxide, i. e. the condensation product of Example 1 which was found to provide about the maximum reduction of the plastic index of the clay soil. The percent power reduction was found to be 14, 40 and 21, respectively at soil moisture contents of 15%, 20% and 24%.

I claim:

1. A method for the improvement of the workability of clay-containing soils comprising the distribution in clay soils in intimate admixture therewith of from about 0.05 to about 2 weight percent, based on the dry weight of the soil, of a tertiary-alkylmercaptan-ethylene oxide condensation product defined by the structural formula $RS(CH_2CH_2O)_nH$, wherein R is a tertiary-alkyl radical containing from 8 to 16 carbon atoms and $n$ is a number from 2 to 20.

2. The method of claim 1, wherein from about 0.1 to about 1 percent of the tertiary-alkylmercaptan-ethylene oxide condensation product is employed.

3. The method of claim 1, wherein the tertiary-alkyl radical is tertiary-dodecyl and $n$ is a number from 4 to 14.

4. The method of claim 3, wherein $n$ is a number from about 6 to about 10.

5. The method of claim 4, wherein from about 0.1 to about 1 percent of the tertiary-dodecylmercaptan-ethylene oxide condensation product is employed.

6. The method of claim 4, wherein $n$ is about 8.

7. The method of claim 6, wherein from about 0.1 to about 1 percent of the tertiary-dodecylmercaptan-ethylene oxide condensation product is employed.

8. A method for the improvement of the workability of clay-containing soils comprising the distribution in clay soils containing from about 20 to about 70 percent clay in intimate admixture therewith of from about 0.05 to about 2 weight percent, based on the dry weight of the soil, of a tertiary-alkylmercaptan-ethylene oxide condensation product defined by the structural formula $RS(CH_2CH_2O)_nH$, wherein R is a tertiary-alkyl radical containing from 8 to 16 carbon atoms and $n$ is a number from 2 to 20.

9. The method of claim 8, wherein from about 0.01 to about 1 percent of the tertiary-alkylmercaptan-ethylene oxide condensation product is employed.

10. The method of claim 8, wherein the tertiary-alkyl radical is tertiary-dodecyl and $n$ is a number from 4 to 14.

11. The method of claim 10, wherein $n$ is a number from about 6 to about 10.

12. The method of claim 11, wherein from about 0.01 to about 1 percent of the tertiary-dodecylmercaptan-ethylene oxide condensation product is employed.

13. The method of claim 11, wherein $n$ is about 8.

14. The method of claim 13, wherein from about 0.1 to about 1 percent of the tertiary-dodecylmercaptan-ethylene oxide condensation product is employed.

15. Clay-containing soil conditioned with from about 0.05 to about 2 weight percent, based on the dry weight of the soil, of a tertiary-alkylmercaptan-ethylene oxide condensation product defined by the structural formula $RS(CH_2CH_2O)_nH$, wherein R is a tertiary-alkyl radical containing from 8 to 16 carbon atoms and $n$ is a number from 2 to 20.

16. Clay-containing soil conditioned with from about 0.1 to about 1 weight percent, based on the dry weight of the soil, of a tertiary-alkylmercaptan-ethylene oxide condensation product defined by the structural formula $RS(CH_2CH_2O)_nH$, wherein R is a tertiary-alkyl radical containing from 8 to 16 carbon atoms and $n$ is a number from 2 to 20.

17. Clay-containing soil conditioned with from about 0.05 to about 2 weight percent, based on the dry weight of the soil, of a tertiary-dodecylmercaptan-ethylene oxide condensation product wherein the mole ratio of the ethylene oxide to the tertiary-dodecylmercaptan is from about 4 to 14.

18. The clay-containing soil of claim 17, wherein the mole ratio is from about 6 to about 10.

19. The clay-containing soil of claim 17, wherein the mole ratio is about 8.

References Cited in the file of this patent

UNITED STATES PATENTS

| | | |
|---|---|---|
| 2,614,917 | Zuckel | Oct. 21, 1952 |
| 2,637,701 | Doerr | May 5, 1953 |
| 2,652,379 | Hedrick | Sept. 15, 1953 |
| 2,717,884 | Mo | Sept. 13, 1955 |